(12) United States Patent
Park

(10) Patent No.: US 6,873,704 B1
(45) Date of Patent: Mar. 29, 2005

(54) APPARATUS FOR REMOVING ECHO FROM SPEECH SIGNALS WITH VARIABLE RATE

(75) Inventor: Tae-San Park, Yongin-shi (KR)

(73) Assignee: Samsung Electronics Co., LTD, Kyungki-do (KR)

( * ) Notice: Subject to any disclaimer, the term of this patent is extended or adjusted under 35 U.S.C. 154(b) by 0 days.

(21) Appl. No.: 09/413,694

(22) Filed: Oct. 7, 1999

(30) Foreign Application Priority Data

Oct. 13, 1998 (KR) .......................................... 98-42803

(51) Int. Cl.⁷ ............................................. H04M 9/08
(52) U.S. Cl. ............................ 379/406.08; 379/406.14; 370/290
(58) Field of Search ....................... 379/406.01, 406.04, 379/406.05, 406.08, 406.09, 406.1, 406.11, 392.01, 395.01; 370/286, 287, 289, 290; 381/71.11, 71.12, 94.3

(56) References Cited

U.S. PATENT DOCUMENTS

| | | | | |
|---|---|---|---|---|
| 4,771,396 A | * | 9/1988 | South et al. ............ 364/724.16 |
| 5,329,472 A | * | 7/1994 | Sugiyama .................... 708/322 |
| 5,539,731 A | * | 7/1996 | Haneda et al. ............... 370/286 |
| 5,721,772 A | * | 2/1998 | Haneda et al. ......... 379/406.14 |
| RE358 E | * | 8/1998 | Shimauchi et al. ............ 381/66 |
| 5,790,440 A | * | 8/1998 | Fujii et al. .............. 364/724.19 |
| 5,815,496 A | * | 9/1998 | Flanagan et al. ........... 370/287 |
| 5,940,455 A | * | 8/1999 | Ikeda .......................... 375/350 |
| 6,009,083 A | * | 12/1999 | Flanagan et al. ........... 370/287 |
| 6,035,312 A | * | 3/2000 | Hasegawa .................... 708/322 |
| 6,181,794 B1 | * | 1/2001 | Park et al. ............. 379/406.08 |
| 6,185,301 B1 | * | 2/2001 | Muraoka ..................... 379/410 |
| 6,219,418 B1 | * | 4/2001 | Eriksson et al. ....... 379/406.08 |
| 6,256,384 B1 | * | 7/2001 | Trump .................... 379/406.08 |
| 6,266,422 B1 | * | 7/2001 | Ikeda ...................... 381/71.11 |
| 6,553,122 B1 | * | 4/2003 | Shimauchi et al. ........... 381/66 |

* cited by examiner

*Primary Examiner*—Binh Tieu
(74) *Attorney, Agent, or Firm*—F. Chau & Associates, LLC (57) ABSTRACT

An echo canceler for canceling echo components having a plurality of cascade-connected adaptive filters and a plurality of update control means. The echo canceler may further include an update control selective circuit for generating selective signals which enable or disable the update control means. Power values of opposite speech signals generated from the adaptive filters are used to control the updating of filter coefficients of the adaptive filters.

13 Claims, 6 Drawing Sheets

(Prior Art)

APPARATUS FOR REMOVING ECHO FROM SPEECH SIGNALS WITH VARIABLE RATE

FIELD OF THE INVENTION

The present invention relates to an echo canceler of a variable rate vocoder, and more particularly to an echo canceler and a method for preventing undesirable disturbance of converged filter coefficients.

BACKGROUND OF THE INVENTION

Echo cancelers have recently gained importance with the increased usage of CDMA (code division multiple access) in mobile telephony. Echo signals are present in a digital telephone connection. The echo signals distort or disturb speech signals generated from the two ends of the connection. Echo cancelers are used to cancel the echo signals. However, a long delay time is necessary in such cancellation. The delay time required to cancel the echo signal by the echo canceler is called 'convergence time'. The convergence time of the echo canceler is an important parameter for measurement of the quality of the echo canceler. The smaller the convergence time, the closer is the reproduction of the original sound.

Figure 1:
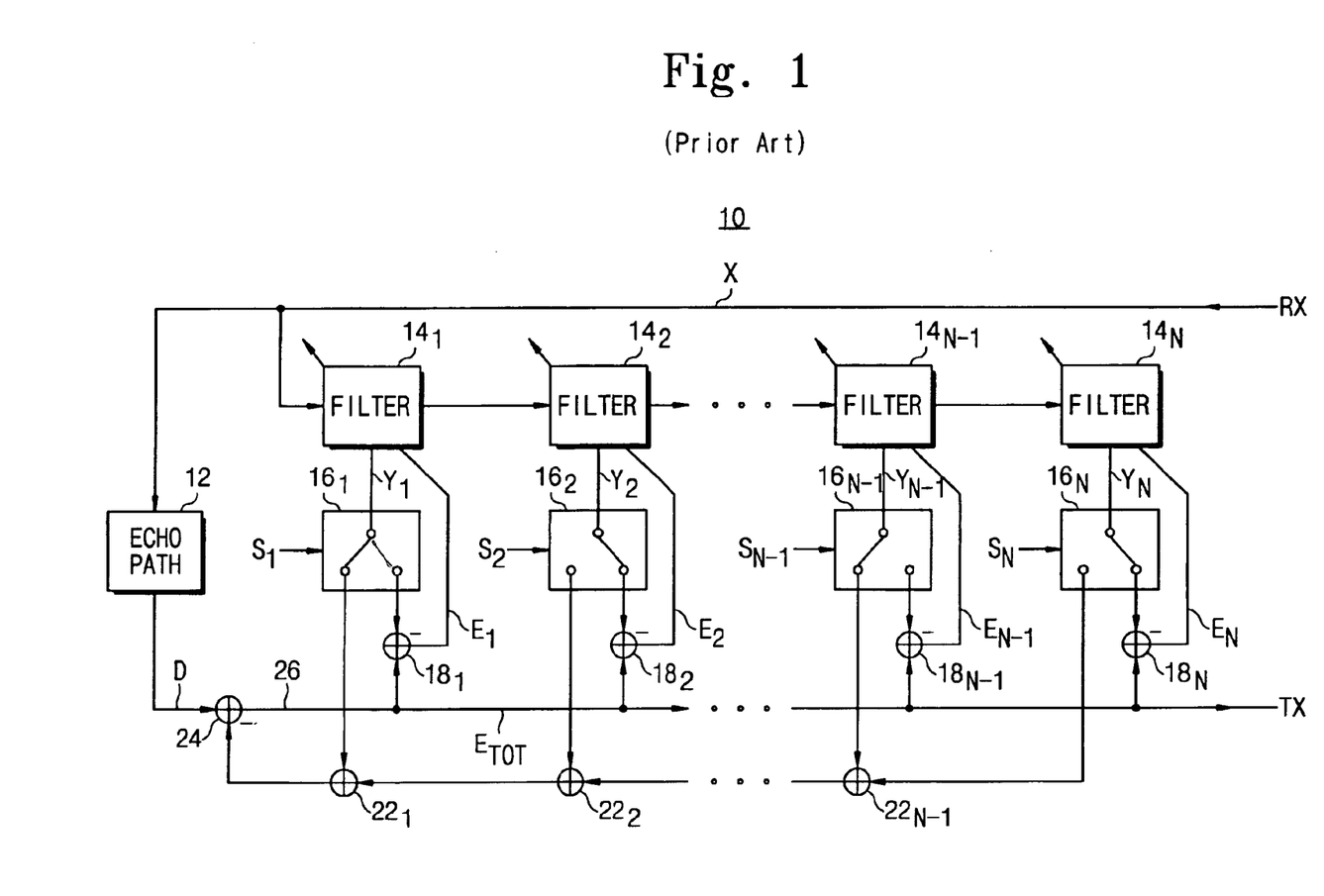
FIG. 1 is a block diagram illustrating an arrangement of a conventional echo canceler.
Figure 2:
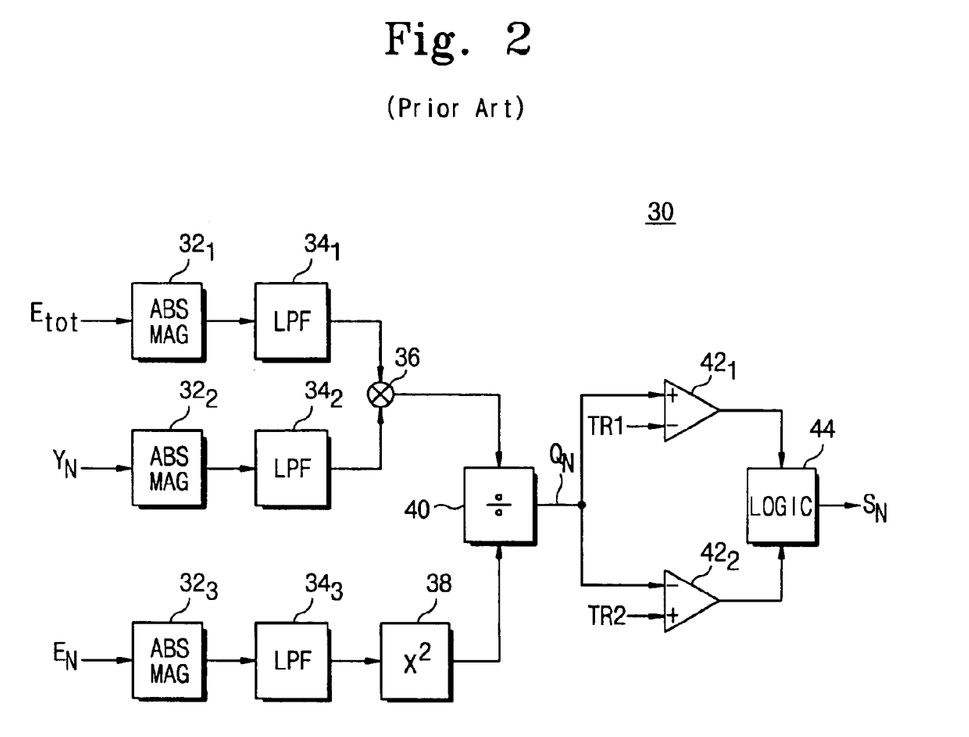
FIG. 2 is a block diagram illustrating an arrangement of a selective circuit generating a switch selective signal illustrated in FIG. 1.

Adaptive algorithms are used in echo cancelers. One popular algorithm is the NLMS (normalized least mean square) algorithm. A filter is used to cover practically all occurrences of impulse responses. A filter output signal is conventionally subtracted from the signal containing an echo, thereby forming a different signal used to update the filter. U.S. Pat. No. 5,428,605 describes a prior art echo canceler and it is shown in FIGS. 1 and 2.

A plurality of filters $14_1$–$14_N$ for canceling out an echo signal are connected in cascade between two lines RX and TX included in a four-wire loop. The echo signal emerges in an echo path 12 from speech signals of a called person or a calling person of a telephone call connection. The filters $14_1$–$14_N$ act as a digital adaptive filter. They receive an input signal X through a line RX. The input signal X is applied to the echo path 12.

An echo signal is decided through each of output signals $Y_1$–$Y_N$ of the filters $14_1$–$14_N$. An echo signal is cancelled from an echo-included signal D through subtraction means 24. Consequently, each of the sub traction means outputs each of difference signals $E_1$–$E_N$. The filters $14_1$–$N$ update filter coefficients with correspondence to an adaptive algorithm by receiving the different signals $E_1$–$E_N$.

The filters $14_1$–$14_N$ receive the input signal X and then generate the output signals $Y_1$–$Y_N$, respectively. The output signals $Y_1$–$Y_N$ are applied to a plurality of selectable switches $16_1$–$16_N$. The switches $16_1$–$16_N$ are connected to subtraction means $18_1$–$18_N$, respectively. That is, the switches $16_1$–$16_N$ are connected to negative input terminals of the subtraction means $18_1$–$18_N$, respectively. Positive input terminals of the subtraction means $18_1$–$18_N$ receive an echo-reduced signal 26 which is obtained by reducing the echo signal from the echo-included signal D. The switches $16_1$–$16_N$ also receive selective signals $S_1$–$S_N$, respectively. Accordingly, the subtraction means $18_1$–$18_N$ output the different signals $E_1$–$E_N$, respectively. The selective signals $S_1$–$S_N$ are generated from a switch control circuit 30 shown in FIG. 2 to select at least one of the filters $14_1$–$14_N$. The switch control circuits 30 will be described hereafter. An output signal $Y_N$ of a filter to which corresponding switch is connected to the right side output terminal is not used to cancel an echo signal. However, the output signal $Y_N$ is used to output an error signal $E_N$ which is in turn used to update the filter.

An error signal is a difference between the echo-reduced signal 26 and a filter output signal provided through a switch which is switched to its right side output terminal. For example, error signals $E_2$ and $E_N$ in FIG. 1 are such error signals.

In the initial stage of a converging process such as the beginning of a new telephone call, all switches are switched to the switching terminals on the right side. The following error signals are thereby obtained: $E_1 = D - Y_1$, $E = D - Y_2$, - - - , $E_N = D - Y_N$. This is resulted from an equal supply of the echo-included signal D to the positive input terminals of the subtraction means $18_1$–$18_N$ in the initial stage, respectively. This signal is called an echo-reduced signal $F_{TOT}$.

In the initial stage (that is, before enabling filters to use actively to cancel an echo), the filters adjust in an endeavor to cancel the total echo signal. In this case, the filters are converged into a certain level, respectively. Since a filter among the cascade-connected filters is generally disturbed by some part of the total echo signal, the echo signal is actually canceled by one and more filters of the other filters.

The quality measurement of an adaptive filter is continuously calculated in order to be able to establish which filters perform useful work. In other words, the quality measurements and values are used to form switch control signals. When the quality measurement of a filter exceeds a predetermined value, the filter renders the corresponding switch switched to its left switching position.

When the measurement resultant is lower than the predetermined value, the filter is disabled so as for the corresponding switch to be switched to its right switching position. An output signal of the filter is added in an adding means to other output signals of the filter which are added in other adding means, respectively. The resultant summation signal is subtracted from the echo-included signal D in subtraction means 24. For example, the filters $14_1$–$N_{-1}$ are enabled to reduce the echo signal appeared in the echo-included signal D. An output signal of the enabled filter is summed to be $Y_1 + Y_{N-1}$, and an echo-reduced signal $E_{TOT}$ becomes equal to: $D - (Y_1 + Y_{N-1})$. These are subtracted from the echo-included signal D by a plurality of cascade-connected subtraction means, respectively.

Since the output signals of the enabled filters do not appear on the input signals of the subtraction means, all enabled filters will obtain error signals equally as large as the echo-reduced signal $E_{TOT}$. The error signal of the disabled filter is equal to the echo-reduced signal $E_{TOT}$ decreased by the output signal of the filter. In the illustrated example, the [Equation 1] is obtained:

$$E_1 = E_{TOT} - Y_1 = D - (Y_1 + Y_{N-1})$$
$$E_2 = E_{TOT} - Y_2 = D - (Y_1 + Y_2 + Y_{N-1})$$
$$E_N = E_{TOT} - Y_N = D - (Y_1 + Y_{N-1} + Y_n) \quad \text{[Equation 1]}$$

Therefore, when a filter is enabled, its output signal will be used to update the remaining filters. It is the fact that every enabled filter receives large error signals. Every error signal of these filters can be caused to go down to logic 0 or to the vicinity of logic 0 by effectively canceling the echo signal. Accordingly, none of the filters will be disturbed by any part of the total echo that shall be canceled by other filters.

FIG. 2 illustrates an arrangement of a switch control circuit generating a switch control signal illustrated in FIG. 1. Referring to FIG. 2, the switch control circuit 30 is required for each filter $14_1$–$N$ included in the echo canceler 10.

The echo-reduced signal $E_{TOT}$, the filter output signal $Y_N$, and the filter error signal $E_N$ are applied to the switch control circuit. Some signals are generated from absolute magnitude forming means $32_1$, $32_2$, and $32_3$. Each of the signals is then filtered in its respective lowpass filter means (LPF) $34_1$, $34_2$, and $34_3$. Signals deriving from the echo-reduced signal $E_{TOT}$ and the filter output signal $Y_N$ are multiplied in a multiplier 36, so that a signal $|E_{TOT}|*|Y_N|$ is generated. A signal deriving from a lowpass filter $34_3$ of the filter error signal $E_N$ is squared in a quadrating means 38, so that a signal $|E_N|*|E_N|$ is generated.

The signal from the multiplier 36 is divided by the signal from the quadrating means 38 in a division means 40. The quality measurement $Q_N$ is generated from the division means 40 and its equation is as follows:

$$Q_N(|E_{TOT}|/|E_N|)*(|Y_N|/|E_N|)=(|E_{TOT}|*|Y_N|)/(E_N*E_N) \quad \text{[Equation 2]}$$

According to [Equation 2], the quality measurement $Q_N$ is proportioned to the output signal $Y_N$. When the quality measurement $Q_N$ exceeds a first threshold value Tr1, the switch control signal $s_N$ goes to logic 1. When the quality measurement $Q_N$ becomes lower than a second threshold value Tr2, the switch control signal $s_N$ goes to logic 0. In this case, when the switch control signal $s_N$ is logic 1, the switch is connected to its left switching position.

The quality measurement $Q_N$ is used as input signals of a first comparator $42_1$ and a second comparator $42_2$. That is, the quality measurement $Q_N$ is compared in the first comparator $42_1$ with the first threshold value Tr1 of the filter enabled, while in the second comparator $42_2$ with the second threshold value Tr2 of the filter disabled. Successively, output signals of the comparators $42_1$ and $42_2$ are respectively inputted to a logic means 44 which generates the switching control signal $S_N$ which is delivered to the filter. For example, the logic means 44 generates logic 1 when the filter shall be enabled, and logic 0 is generated when the filter shall be disabled.

The quality measurement $Q_N$ which is able to cancel the greatest echo will be the first filter to exceed the first threshold value Tr1. This is why the first filter has a relatively large output signal and a relatively small error signal. As a result of enabling or coupling to the first filter, the error signals for the remaining filters will be reduced by the value of the output signal of the enabled filter, since this output signal is subtracted from the echo-included signal in the subtraction means. The quality measurement of remaining filter will increase therewith.

Further, the error signals of the filters that are not enabled will be also reduced for each new filter which is enabled after the first enabled filter. Consequently, the smaller echo will be initially hidden by the larger echoes. No significant work can be performed by the filters. That is, the only small echo signals can be canceled by the filters. The input signal, however, is so small in that its quality measurement cannot exceed the filter enabling threshold value Tr1. The foregoing filters will never be enabled.

When a filter is enabled, its quality measurement will be slightly reduced. This results from the fact that the signal $E_{TOT}$ is reduced by the filter output signal.

A filter coefficient will be converged when an echo signal is generated by the speech signal including an echo signal from an opposite person. Further, the filter coefficient will be disturbed by the speech signal including the echo signal from a user himself.

As mentioned above, the echo canceler may repeat the convergence and disturbance of the filter coefficient. As a result, it takes long time to update unnecessary filter coefficient each time.

SUMMARY OF THE INVENTION

It is an object of the present invention to provide an echo canceler with functions as follows:

(1) to prevent a speech signal including an echo signal from a user himself from disturbing a converged filter coefficient;

(2) to reduce performing time in a position where an echo signal is highly delayed; and (3) to efficiently converge a filter coefficient.

According to a feature of this invention, an echo canceler comprises a plurality of cascade-connected adaptive filters, an update control means generating an update signal for updating filter coefficients of the filters in correspondence with the power of each opposite speech signal from the filters, and a subtraction means generating each of error signals to the update control means after receiving each of output signals from the filters and then canceling echo signals from echo-included signals. Herein, the update control means and the subtraction means are respectively equipped in correspondence with the filters.

In a preferred embodiment of this invention, the update control means generates the update signal by which a filter coefficient of its filter is updated when the power is larger than a threshold value of the filter, whereas the filter coefficient is not updated when the power is smaller than the threshold value.

In the preferred embodiment of this invention, the update control means comprises a comparator receiving and then comparing the power and the threshold value, and a logic circuit generating a signal for updating the filter coefficient when both an output signal of the comparator and the error signal are received and then activated.

According to another feature of this invention, an echo canceler comprises a plurality of cascade-connected adaptive filters, a selective means for generating a selective signal for updating filter coefficients of the filters in correspondence with each opposite speech signal from the filters, an update control means for updating the filter coefficient when the selective signal is received and then activated, and a subtraction means for generating each of error signals to the update control means by receiving each of output signals from the filters and then canceling echo signals from echo-included signals. Herein, the update control means and the subtraction means are respectively equipped in correspondence with the filters.

In another preferred embodiment of this invention, the update control means includes a logic circuit for updating a filter coefficient when the error signal and the selective signal are received and then activated.

In another preferred embodiment of this invention, the selective means controls the number of the selective signals in correspondence with the performing speed of the filters. Herein, a selective signal makes an update control means enabled.

According to the present invention, it is decided whether a filter coefficient will be updated or not by enabling or disabling an update control circuit by means of a power value of an opposite speech signal from an adaptive filter.

Further, an update control circuit is controlled in order to adjust the update of a filter coefficient by equipping an update control selective circuit which generates a selective signal for enabling or disabling the update control circuit by receiving the opposite speech signal from the adaptive filter. An echo signal calculated from each of filters is canceled from an echo-included signal generated through an echo path.

DETAILED DESCRIPTION OF PREFERRED EMBODIMENTS

Hereinafter, the preferred embodiments of this invention will be described in detail with reference to accompanying drawings.

An echo canceler of the present invention includes between two lines included in a four-wire loop a plurality of filters for canceling echo signals. Since the echo signals may have different echo signal delay time depending upon circumstances, the number of taps in the echo canceler will be decided by the circumstances. If decided, the number of taps is allotted to a plurality of adaptive filters.

The allotting method may be 1/N(the number of a filter). Also, various allotting methods may be adopted depending on what filter cancels echo components, and when the echo components are canceled. For example, assuming that sampling frequency is 8 KHz, the number of the adaptive filter is four, and echo signal delay time is 32 ms, then, a first adaptive filter cancels an echo signal of 0–8 ms, a second adaptive filter cancels an echo signal of 8–20 ms, a third adaptive filter cancels an echo signal of 20–28 nm, and a fourth adaptive filter cancels an echo signal of 28–32 ms. In this case, the number of each tap may be defined as 64, 96, 64, and 32 (total: 128 taps).

Figure 3:
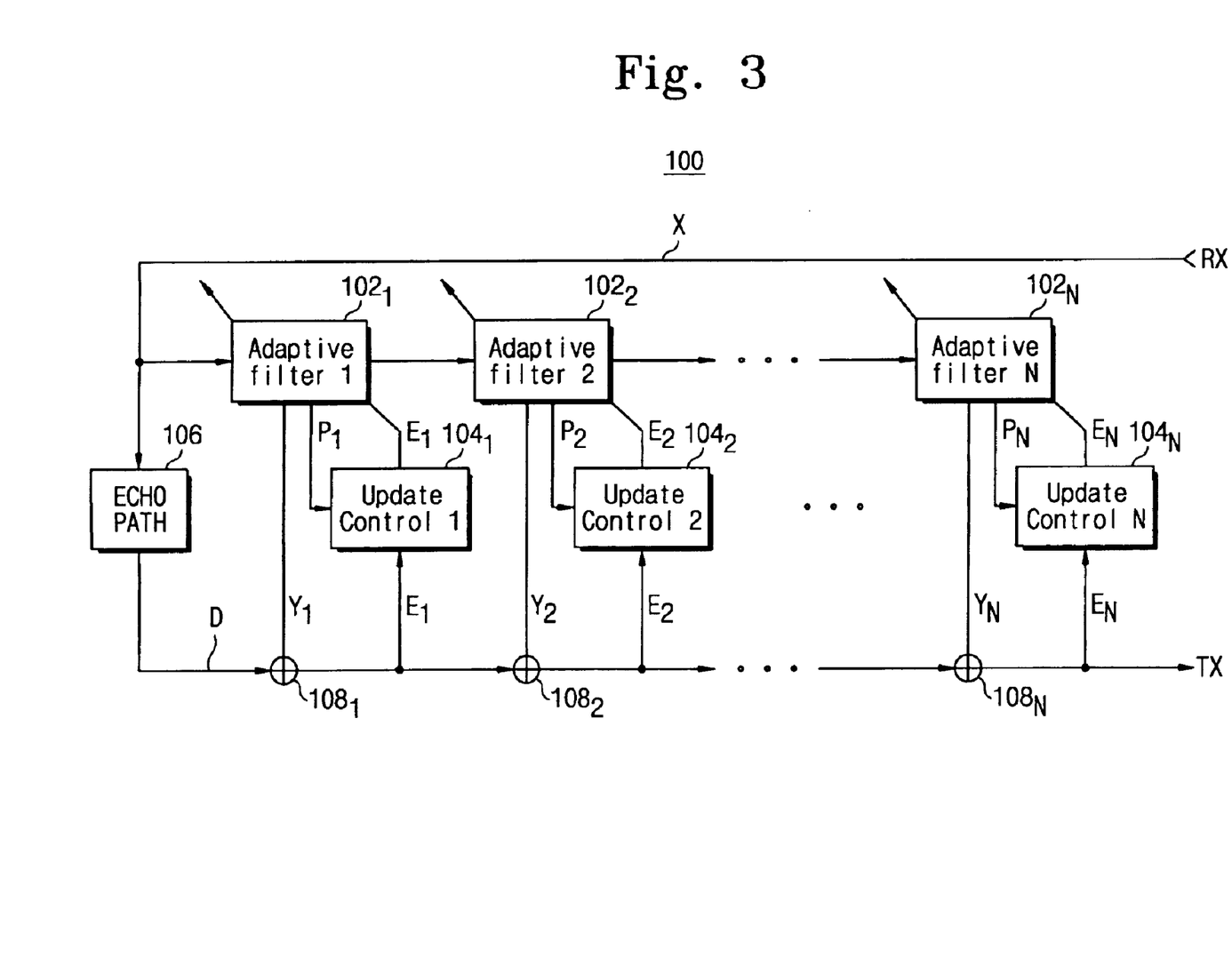
FIG. 3 is a block diagram illustrating an arrangement of an echo canceler according to a first preferred embodiment of this invention.

Referring to FIG. 3, the echo canceler 100 comprises a plurality of cascade-connected adaptive filters $102_1$–$102_N$, a plurality of update control circuits $104_1$–$104_N$ each corresponding to each of the filters, a plurality of subtraction circuits $108_1$–$108_N$ each corresponding to each of the filters, and an echo path 106 where echo signal emerges.

The adaptive filters $102_1$–$102_N$ calculate an echo signal by receiving an input signal X is (that is, a speech signal of a phone user himself or a speech signal from the person at the other end of the call ("an opposite speech signal"), and an echo signal). Afterwards, calculated output signals $Y_1$–$Y_N$ are canceled from an echo-included signal D generated from the echo path 106. Thereby, an echo signal is canceled. Filter coefficients of these filters $102_1$–$102_N$ are updated by receiving update signals corresponding to error signals $E_1$–$E_N$ from the update control circuits $104_1$–$104_N$. As shown in FIG. 3, an error signal is corresponding to an update signal. The update control circuits $104_1$–$104_N$ respectively receive power values $P_1$–$P_N$ of the opposite speech signal from the adaptive filters $102_1$–$102_N$ and the error signals $E_1$–$E_N$ from the subtraction circuits $108_1$–$108_N$, and activate or inactivate the update signals depending on the power values $P_1$–$P_N$.

Figure 4:
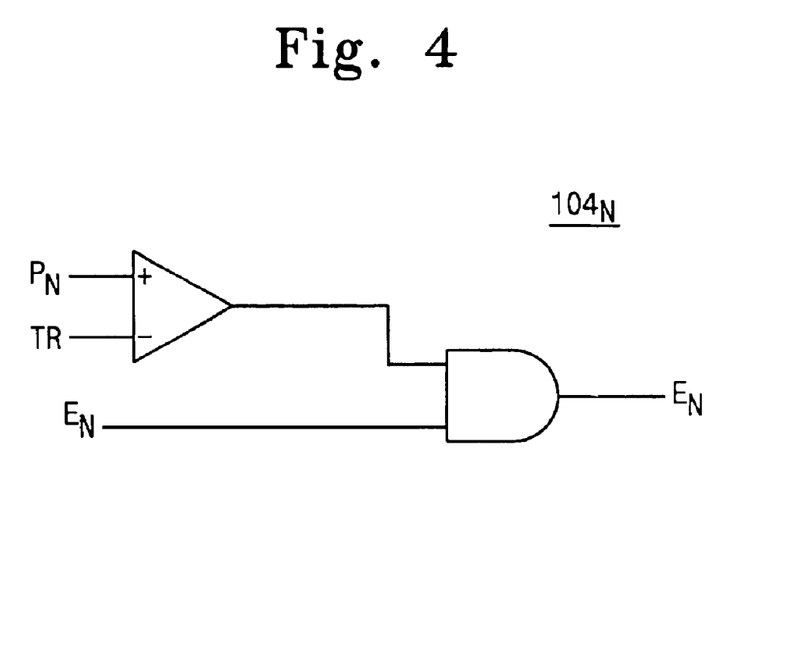
FIG. 4 a block diagram illustrating an arrangement of an update control circuit illustrated in FIG. 3.

Referring to FIG. 4, an update control circuit $104_N$ comprises a comparator and an AND gate. The comparator receives a power value IP on a non-inverting terminal and a threshold value TR on an inverting terminal. The AND gate receives output of the comparator and an error signal $E_N$ and generates an update signal EN. When the power value P of the opposite speech signal is larger than the threshold value TR, the update control circuit $104_N$ generates the update signal, thereby, updating a filter coefficient of an adaptive filter shown in FIG. 3. When the power value P is smaller than the threshold value TR, the update signal is disabled to omit updating the adaptive filter coefficient.

Referring to FIG. 3 again, each of the subtraction circuits $108_1$–$108_N$ cancels each of the calculated echo signals (that is, output signals $Y_1$–$Y_N$) of filters $102_1$–$102_N$ from the echo-included signal D. The resultant error signals E-EN are applied to the update control circuits $104_1$–$104_N$, respectively. Each of the adaptive filters $102_1$–$102_N$, therefore, cancel echo components in a predetermined time period after generation of the opposite speech signal through a speaker of a portable telephone. That is, only when a filter coefficient need be updated, the filter coefficient is updated by an update control circuit $104_N$.

By using an NLMS (normalized least mean square) algorithm, a filter coefficient mu is obtained as follows:

$$mu = (2 * \mu * e)/P$$

$$\Delta H = mu * x$$

$$H = H + \Delta H \qquad \text{[Equation 3]}$$

In the [Equation 3], "$\mu$" is a constant, power value P is a magnitude in a random interval of the opposite speech signal, "e" is a filter error signal $E_N$, and "H" is a convergence constant. In particular, the filter error signal e is obtained by subtracting an output signal $Y_N$ from an echo-included signal D of a user's speech signal. For example, if there is only the speech signal of the user, the filter coefficient should be not altered. The "P" is small and the "e" is large, thereby increasing "mu". Consequently, the "$\Delta H$" is altered to exert a bad influence upon the convergence. If there is the opposite speech signal, the "P" is large and in inverse proportion to "mu". However, the "e" is proportion to the "mu". Since the filter coefficient moves to the convergence direction, it will be continuously updated.

In case of a double talk that is a mixture of a speech signal of a person himself and an opposite speech signal, the "mu" is highly altered and the filter coefficient repeats the convergence and the disturbance. It is therefore decided if the filter coefficient is updated by enabling or disabling the update control circuit with the power value of the opposite speech signal.

Figure 5:
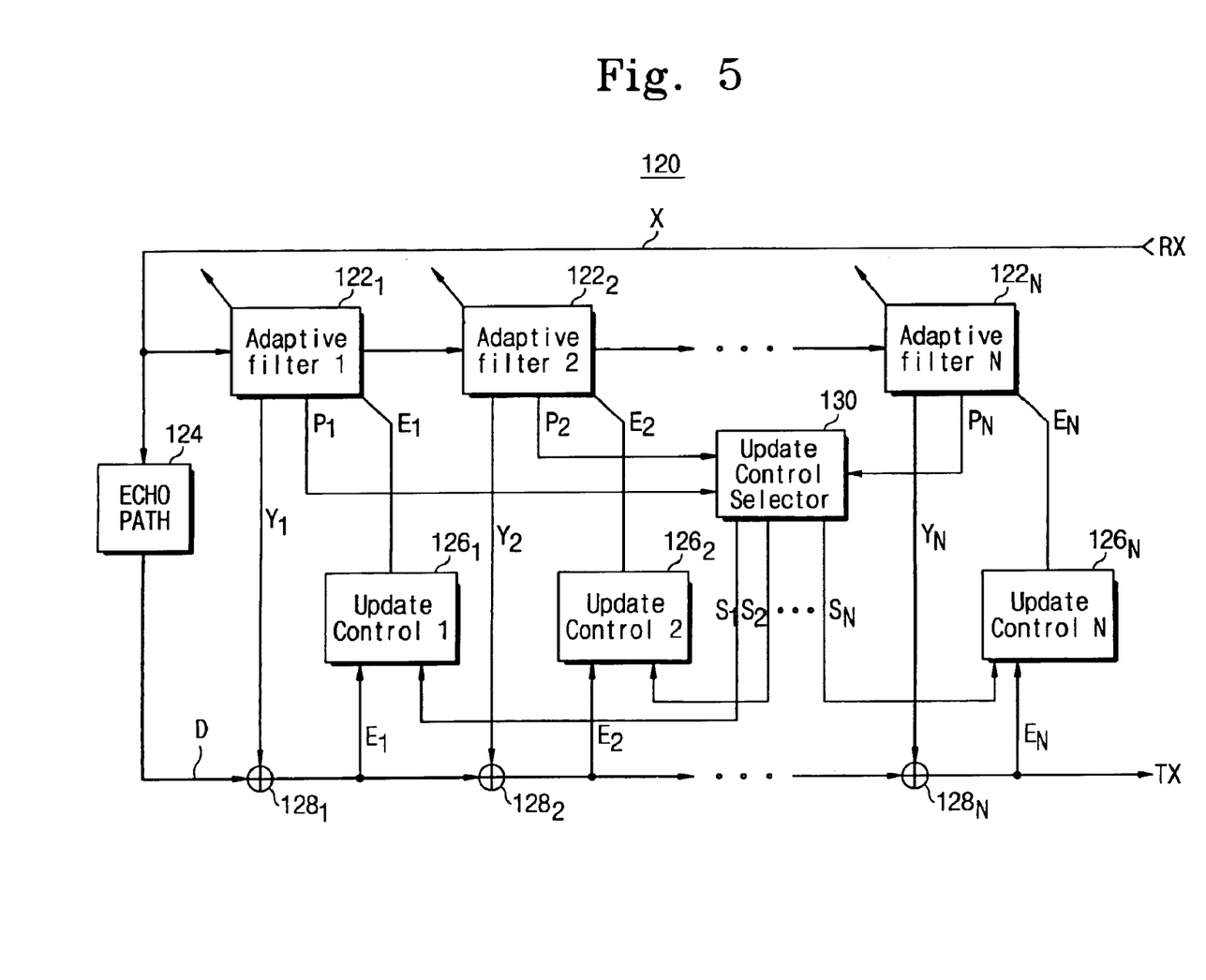
FIG. 5 is a block diagram illustrating an arrangement of an echo canceler according to another preferred embodiment of this invention.

FIG. 5 is a block diagram of an echo canceler according to another preferred embodiment of the present invention. Referring to FIG. 5, an echo canceler 120 for cackling echo components in the limited performing time, comprises an update control selective circuit 130, a plurality of adaptive filters $122_1$–$122_N$, a plurality of update control circuits $126_1$–$126_N$ respectively corresponding to the filters $122_1$–$122_N$, and an echo path 124.

The adaptive filters $122_1$–$122_N$ calculate an echo signal after receiving an input signal X including a speech signal of a user himself or an opposite speech signal and an echo signal. Then, output signals $Y_1$–$Y_N$ (that is, echo signals) of the adaptive filters $122_1$–$122_N$ are canceled from an echo-included signal D generated from the echo path 124. Opposite speech signal power values $P_1$–$P_N$ calculated from the input signal X are supplied to the update control selective circuit 130. The update control selective circuit 130 generates selective signals $S_1$–$S_N$ which enable or disable the update control circuits 126$_1$–126$_N$, respectively. Filter coefficients of the filters 122$_1$–122$_N$ are updated by receiving update signals from the update control circuits 126$_1$–126$_N$ which generates the update signals by receiving signals $E_1$–$E_N$ and the selective signals $S_1$–$S_N$. As shown in FIG. 5, the error signals $E_1$–$E_N$ are correspondent with the update signals.

The subtraction circuits 128$_1$–128$_N$ cancel from the echo-signal D echo signals (that is, the output signals $Y_1$–$Y_N$) of the filters 122$_1$–122$_N$, respectively. The error signals $E_1$–$E_N$ obtained from the subtraction circuits 128$_1$–128$_N$, respectively, are supplied to the update control circuits 126$_1$–126$_N$, respectively. Thus, the echo canceler 120 cancels from the echo-included signal D the output signals (that is, the sum of echo components) generated from the adaptive filters, respectively.

Figure 6:
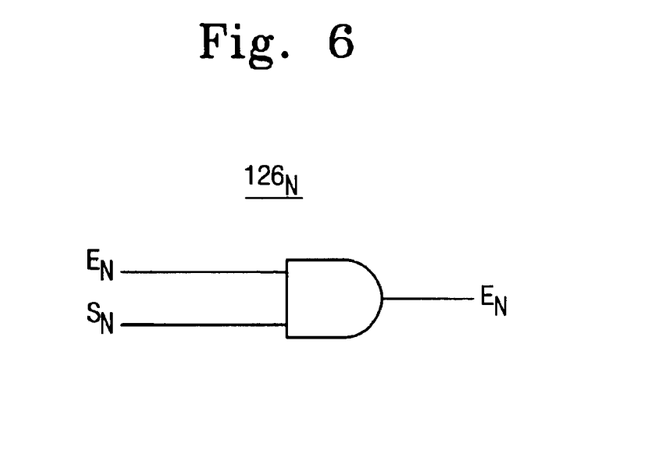
FIG. 6 is a block diagram illustrating an arrangement of an update control selective circuit illustrated in FIG. 5.

Referring to FIG. 6, an update control circuit 126$_N$ comprises an AND gate. When an error signal $E_N$ and a selective signal $S_N$ received through separate input terminals are activated, the AND gate generates an update signal.

Figure 7:
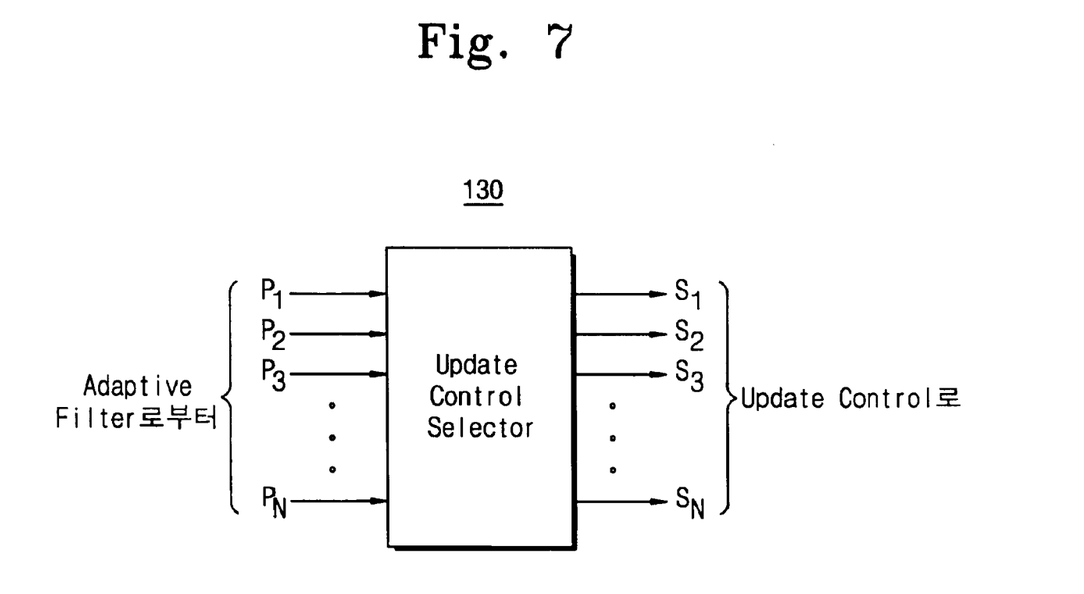
FIG. 7 is a block diagram of a control selective circuit illustrated in FIG. 7.

Referring to FIG. 7, the update control selective circuit 130 generates the selective signals $S_1$–$S_N$ to be used for updating the filter coefficients. That is, the update control selective circuit 130 generates the selective signals $S_1$–$S_N$ for enabling or disabling the update control circuits 126$_1$–126$_N$ by receiving the power values from the adaptive filters 122$_1$–122$_N$. The number of enabled selective signals $S_1$–$S_N$ is decided depending upon the performing speed of the echo canceler 120.

Thus, it is possible under circumstances of long echo delay time to cancel an echo signal with the long echo delay time by using many taps and to enhance the performing speed of an echo canceler by updating the filter coefficients.

Although various modifications may be suggested by those versed in the art, it should be understood that the present invention embodies all such modifications as reasonably and properly come within the scope of its contribution to the art.

What is claimed is:

1. An echo canceler, comprising:
   at least one adaptive filter for extracting at least one echo signal from speech signals and for calculating at least one power value of the speech signals;
   at least one subtraction means for generating at least one error signal by subtracting the at least one echo signal from the speech signals; and
   at least one update control means for selectively updating at least one filter coefficient of the at least one adaptive filter in response to the at least one power value and the at least one error signal.

2. The apparatus of claim 1, wherein the update control means updates the filter coefficient when the power value is larger than a threshold value of the adaptive filter.

3. The apparatus of claim 2, wherein the update control means comprises:
   a comparator for comparing the power value and the threshold value; and
   a logic circuit for receiving an output signal of the comparator and the error signal from the subtraction means, and for generating a update signal to update the filter coefficient when the output signal and the error signal are activated.

4. The apparatus of claim 1, further including a echo path for making the echo components emerged from the speech signals which is provided to the at least one subtraction means.

5. The apparatus of claim 2, wherein the update control means stops updating the filter coefficient when the power value is smaller than the threshold value.

6. An apparatus for removing echo components from speech signals in a vocoder, the apparatus comprising:
   a plurality of adaptive filters connected each other in cascade, wherein each adaptive filter receiving the speech signals extracts an echo signal and generates a power value of the speech signals;
   an echo path for making the echo components emerged from the speech signals;
   a plurality of subtraction means each for generating an error signal by subtracting the echo signal of the adaptive filter from the speech signals of the echo path; and
   a plurality of update control means each for updating a filter coefficient of the adaptive filter in response to the power value from the adaptive filter and the error signal from the subtraction means.

7. An apparatus for removing echo components from speech signals in a vocoder, the apparatus comprising:
   at least one adaptive filter for extracting at least one echo signal from the speech signals and for calculating at least one power value of the speech signals;
   a selective means for generating at least one selective signal in response to the at least one power value of the speech signals;
   at least one subtraction means for generating at least one error signal by subtracting the at least one echo signal from the speech signals; and
   at least one update control means for updating at least one filter coefficient of the at least one adaptive filter when the at least one selective signal provided from the selective means is activated.

8. The apparatus of claim 7, further including a echo path for making the echo components emerged from the speech signals which is provided to the at least one subtraction means.

9. The apparatus of claim 7, wherein the update control means includes a logic circuit for receiving the error signal from the subtraction means and the selective signal from the selective means, and for generating a update signal to update the filter coefficient when the error signal and the selective signal are activated.

10. The apparatus of claim 7, wherein the selective means generates the at least one selective signal in response to a performing speed of the at least one adaptive filter.

11. The apparatus of claim 10, wherein the at least one selective signal enables the at least one update control means for updating the at least one filter coefficient.

12. An apparatus for removing echo components from speech signals in a vocoder, the apparatus comprising:
   a plurality of adaptive filters connected each other in cascade, for receiving the speech signals and generating a plurality of echo signals extracted from the speech signals and a plurality of power values of the speech signals, respectively;

an echo path for making the echo components emerged from the speech signals;

a selective means for generating a plurality of selective signals in response to the plurality of power values of the speech signals, respectively;

a plurality of subtraction means for respectively generating a plurality of error signals by subtracting the plurality of echo signals from the speech signals provided by the echo path; and a plurality of update control means for updating the plurality of filter coefficients of the plurality of adaptive filters, respectively, in response to the plurality of selective signals from the selective means.

13. The apparatus of claim 12, wherein the update control means updates the filter coefficient when the update control means receives the selective signal which is activated.

* * * * *